C. G. DEAN.
CHAIN BELT.
APPLICATION FILED MAY 11, 1920.

1,414,691.

Patented May 2, 1922.

Charles G. Dean

UNITED STATES PATENT OFFICE.

CHARLES G. DEAN, OF MILWAUKEE, WISCONSIN.

CHAIN BELT.

1,414,691.　　　　　Specification of Letters Patent.　　Patented May 2, 1922.

Application filed May 11, 1920. Serial No. 380,622.

*To all whom it may concern:*

Be it known that I, CHARLES G. DEAN, a citizen of the United States, and resident of Milwaukee, in the county of Milwaukee and State of Wisconsin, have invented certain new and useful Improvements in Chain Belts; and I do hereby declare that the following is a full, clear, and exact description thereof.

My invention pertains to new and useful improvements in link or chain belts which are adapted to be associated in connection with sprockets and gears or other toothed elements whereby to be driven by or to drive the same.

The particular class of belts to which my invention relates is known as the "silent chain" type owing to the fact that the teeth of the toothed element such as a gear or sprocket are engaged on their faces instead of at their roots as in the case of the ordinary roller or block chain belt. Ordinarily the links which compose such "silent chain" belts are formed from a number of stampings or castings so arranged that their edges engage the faces of the teeth. Such a manner of constructing a link is relatively expensive as is also the cost of assembling.

It is therefore the primary object of the present invention to provide a simply constructed silent chain belt, the links of which may be inexpensively manufactured and assembled.

It is a further important object of the invention to provide a chain belt, the active links of which are so constructed that their side portions are engaged with the teeth so as to provide an unbroken bearing surface across the entire faces of said teeth.

A still further object of the invention is to provide a chain belt which can be used with equal facility in connection with either sprockets or gears.

With these general objects in view the invention resides in the novel features of construction, combination and arrangement of parts which will be hereinafter more particularly described and claimed.

In the accompanying drawings

Figure 1:
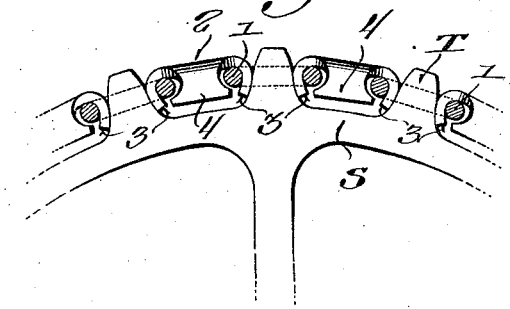
Figure 1 represents a side elevational view of a portion of a sprocket showing a section of a chain belt constructed in accordance with my invention associated therewith, parts of said belt being in section.

Referring more particularly to said drawings, the reference character S indicates a sprocket having teeth T, and G denotes a gear having its usual teeth T', my improved chain belt being associated therewith in such a manner that the faces of the teeth T and T' are engaged and the links of said belt are spaced from the roots of the teeth or the portions of the sprocket and gear between said teeth. Although I have illustrated two methods of using my invention, it is to be understood that it is adapted for use in connection with any toothed member and in any desired relation with respect thereto.

Figure 2:
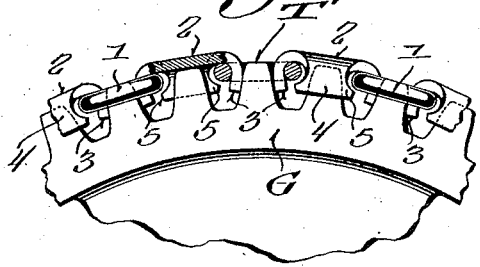
Figure 2 is a similar view of a portion of a gear having my improved chain belt disposed for use thereon.
Figure 3:
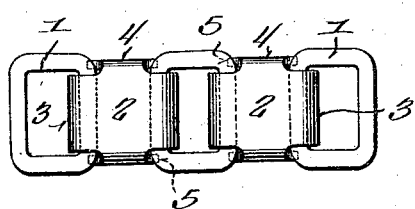
Figure 3 is a plan view of a portion of the belt illustrated in Figures 1 and 2.

As shown in Figures 1, 2 and 3, the preferred form of the invention comprises two series of links 1 and 2, each of the links 1 being in the form of a rectangular loop and made from wire of suitable gauge. The links 2, on the other hand, are stampings made from single blanks of sheet metal. Each of these links 2 has its opposite end portions bent transversely of the main body of the blank and extended laterally to provide bearing ears 3. The free ends of these ears are preferably extended inwardly slightly towards each other so that their outer surfaces will conform substantially to the faces of the teeth T and T'.

These bearing ears 3 also form attaching portions and are adapted to hook into the loops 1 which thus form connector links to join together what might be termed the bearing links 2. Except for the fact that the links 1 serve to connect the other links of the chain belt, they have no function as it is to be seen from the several figures of the drawing that the ears 3 of the links 2 alone engage the teeth.

If the belt remained taut under all conditions, the bearing ears 3 might be retained in the links 1, but since said belt at times becomes slack, it is necessary to provide a positive retaining means. This means is effectively formed in the present instance by bending retaining ears 4 laterally from the opposite side edges of each of the plates forming the links 2. The intermediate portions of these ears 4 are of a width to readily project between the adjacent sides of the links 1, but they are provided with projections 5 which extend towards the bearing ears 3. The distance between the ends of these projections and the ears 3 is considerably less than the diameter of the wire forming the links 1 so as to effectively retain the two series of links in co-operation. In other words, the inner surfaces of the bearing ears 3 and the edges of the retaining ears 4, together with the projections 5, form bearing seats for the links 1. The links 2 are also considerably strengthened by the provision of the retaining ears 4 inasmuch as they are disposed substantially at right angles to the ears 3, and thus the plates from which said links 2 are formed may be of relatively light gauge sheet metal.

Figure 4:
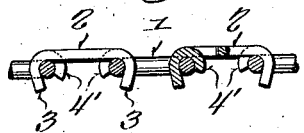
Figure 4 is a side elevational view, partly in section, of a slightly modified form of my invention.

Various other ways of retaining the links 1 in engagement with the links 2 may be employed, and I have shown one such additional arrangement in Figure 4. In this case the retaining ears at the opposite side edges of the links 2 as shown in Figures 1, 2 and 3 is dispensed with and portions of the main body of the blanks from which said links 2 are constructed are stuck inwardly in the direction of the bearing ears 3 to provide retaining fingers 4'. In this manner bearings for the links 1 are formed as in the case of the first described type of the invention. Except for this change the two different series of links shown in Figure 4 are substantially identical with those illustrated in the other figures.

When my improved belt is used in connection with a sprocket wheel, one of the links 2 is usually disposed between each pair of teeth T inasmuch as said teeth are normally considerable distances apart. Thus each tooth is gripped between two of the links 2, whereas each of the links 1 straddles a tooth, as clearly shown in Figure 1. On the other hand, where the teeth are relatively close together as in the case of the gear G, it is necessary to engage the alternate teeth with the bearing ears of the links 2. Those teeth between the ones actively engaged by the bearing links 2 are located within said links. Other different combinations of links and teeth may be made without departing from the spirit of the invention or sacrificing any of the advantages to be derived from my improved chain belt.

I claim:

1. A belt comprising a series of links, certain of said links each consisting of a plate having its opposite side edge portions bent laterally to provide bearing ears for engagement with the faces of teeth.

2. A belt comprising a series of links, certain of said links each consisting of a plate having its opposite side edge portions bent transversely to provide a pair of laterally extended bearing ears for engagement with the faces of teeth.

3. A belt comprising a series of links, certain of said links each consisting of a plate having its opposite end portions bent transversely to the body thereof to provide combined bearing and attaching ears, certain links being connected with said ears.

4. A belt comprising a series of links, certain of said links each consisting of a plate having its opposite end portions bent transversely to the body thereof to provide combined bearing and attaching ears, certain links being connected with said ears, and means carried by the plates for retaining the last mentioned links in engagement therewith.

5. A belt comprising a pair of series of links, the links of one series being arranged alternately with those of the other series, the links of one series each consisting of a plate having its opposite end portions bent transversely to the body thereof to provide combined bearing and attaching ears, the links of the other series each consisting of a loop engageable with the ears of the adjacent plates.

6. A belt comprising a pair of series of links, the links of one series being arranged alternately with those of the other series, the links of one series each consisting of a plate having its opposite end portions bent transversely to the body thereof to provide combined bearing and attaching ears, the links of the other series each consisting of a loop engageable with the ears of the adjacent plates, and means for retaining the loops against disengagement from the ears.

7. A belt comprising a pair of series of links, the links of one series being arranged alternately with those of the other series, the links of one series each consisting of a plate having its opposite end portions bent transversely to the body thereof to provide combined bearing and attaching ears, the links of the other series each consisting of a loop engagable with the ears of the adjacent plates, said plates having portions bent to retain the loops against disengagement from the ears.

8. A belt comprising a pair of series of links, the links of one series being arranged alternately with those of the other series, the links of one series each consisting of a plate having its opposite end portions bent transversely to the body thereof to provide combined bearing and attaching ears, the end edge portions being bent in the same direction to form retaining ears, the links of the other series each consisting of a loop engageable with the bearing and attaching ears and held in co-operation therewith by said retaining ears.

9. As a new article of manufacture, a belt link comprising a stamped plate having its end portions bent transversely thereof and extended laterally to form bearing ears, the side surfaces of the ears being engageable with the faces of teeth.

10. As a new article of manufacture, a belt link comprising a stamped plate having its end portions bent transversely thereof and extended laterally to form bearing and attaching ears adapted to receive looped links, the outer surfaces of the ears being engageable with the faces of teeth, and retaining means on the plate adapted to retain the looped links in engagement with the ears.

11. As a new article of manufacture, a belt link comprising a stamped plate having its end portions bent transversely thereof and extended laterally to form bearing and attaching ears adapted to receive looped links, the outer surfaces of the ears being engageable with the faces of teeth, the opposite side portions of the plate being bent in the same direction as the bearing ears to form retaining ears to secure the looped links in engagement with said bearing ears.

In testimony that I claim the foregoing I have hereunto set my hand at Milwaukee, in the county of Milwaukee and State of Wisconsin.

CHARLES G. DEAN.